Dec. 8, 1970          G. HAVAS ET AL        3,546,562
FREQUENCY CONVERTER FOR CONVERTING THREE-PHASE LOW FREQUENCY
ALTERNATING CURRENT INTO SINGLE-PHASE HIGHER FREQUENCY
ALTERNATING CURRENT

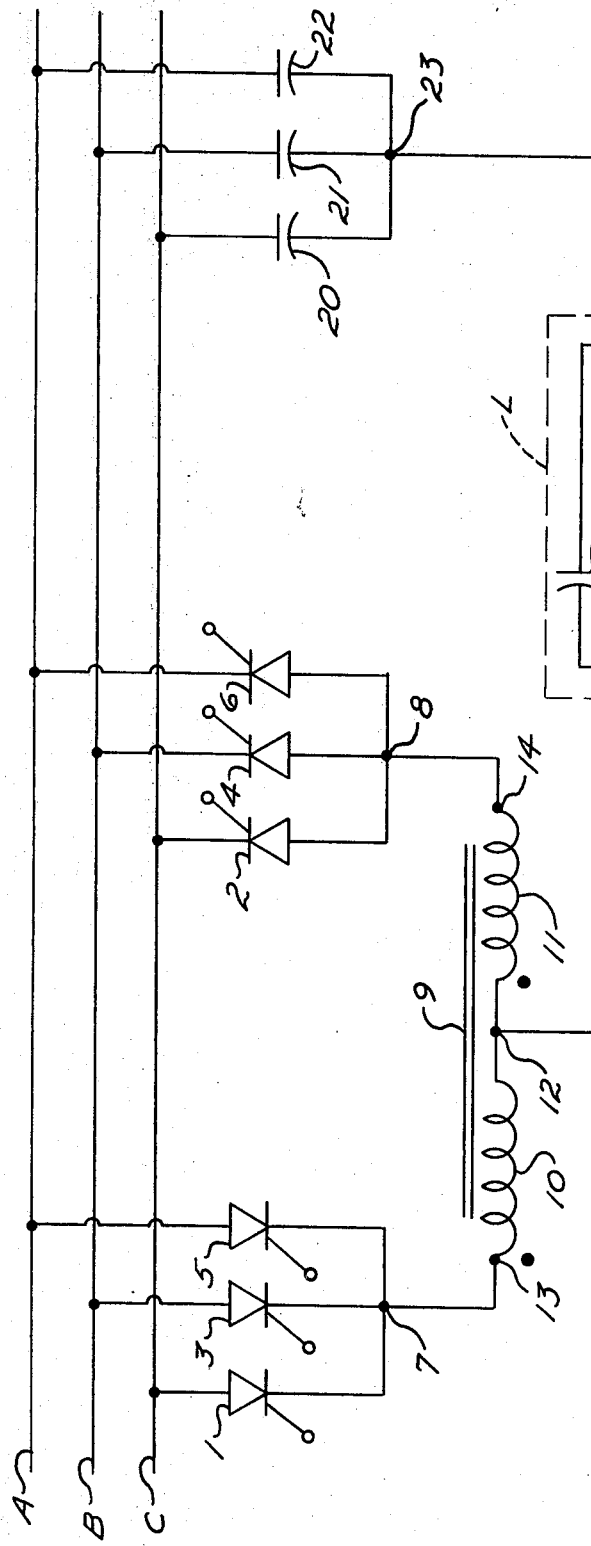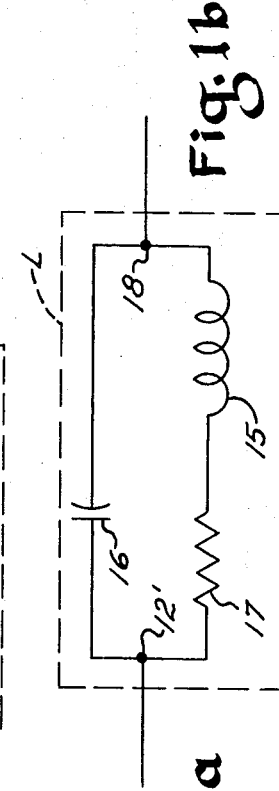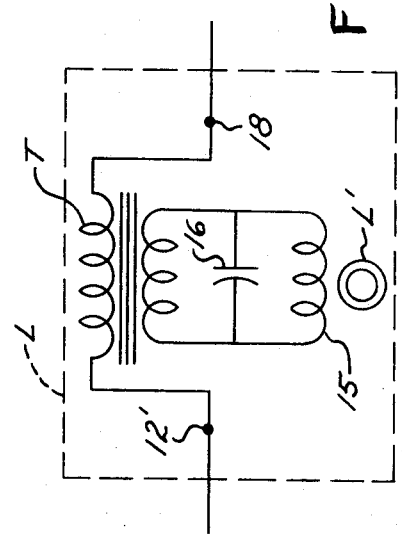
Dec. 8, 1970     G. HAVAS ET AL     3,546,562
FREQUENCY CONVERTER FOR CONVERTING THREE-PHASE LOW FREQUENCY
ALTERNATING CURRENT INTO SINGLE-PHASE HIGHER FREQUENCY
ALTERNATING CURRENT
Filed June 17, 1968     3 Sheets-Sheet 1
INVENTORS
SHASHI B. DEWAN
GEORGE HAVAS
BY

Filed June 17, 1968                   3 Sheets-Sheet 3

LOAD VOLTAGE AND CURRENT VS. TIME

SCR VOLTAGE VS. TIME.
NO COUPLED INDUCTOR

SCR VOLTAGE VS. TIME.
WITH COUPLED INDUCTOR

INVENTORS
SHASHI B. DEWAN
GEORGE HAVAS
BY
J. H. SLOUGH
ATTORNEY

United States Patent Office 3,546,562
Patented Dec. 8, 1970

3,546,562
FREQUENCY CONVERTER FOR CONVERTING THREE-PHASE LOW FREQUENCY ALTERNATING CURRENT INTO SINGLE-PHASE HIGHER FREQUENCY ALTERNATING CURRENT
George Havas, Youngstown, Ohio, and Shashi Bhushan Dewan, Toronto, Ontario, Canada, assignors to Ajax Magnethermic Corporation, Warren, Ohio, a corporation of Ohio
Filed June 17, 1968, Ser. No. 737,639
Int. Cl. H02m 5/14
U.S. Cl. 321—7                                8 Claims

ABSTRACT OF THE DISCLOSURE

There is disclosed herein a frequency converter for converting electrical power from a three phase low frequency alternating current source into single phase higher frequency alternating current power particularly adapted to supply power to induction heating or melting loads where the load is composed of a parallel resonant combination of inductance and capacitance and the energy is delivered to the output circuit at a relatively constant rate, means energizing a switching device alternately each half cycle of the operating frequency.

---

This invention relates to a frequency converter for converting three-phase frequency alternating current power into single-phase higher frequency alternating current power and is particulary adapted to supplying power to induction heating or melting loads wherein the load is composed of a parallel resonant combination of inductance and capacitance.

According to the invention there is provided new and improved means to meet the particular requirements of a parallel resonant or "tank" load that is typical of induction heating and melting installations, while also providing new and improved means for enhancing the ability of silicon controlled rectifiers to operate in frequency converter circuit supplying tank loads. In prior art static frequency converters have consisted of fixed and variable frequency devices. At practical power levels, for example, 100 KW and above, fixed frequency multipliers of the magnetic type are limited in multiplying ability to perhaps nine times the supply frequency. Fixed frequency or variable frequency silicon controlled rectifier frequency converters have suffered serious deratings in the solid state switching devices when delivering power to a changing load or have required complicated and energy consuming circuitry to achieve satisfactory operation.

Techniques used in the design of lower power semiconducting switching device frequency converters cannot be directly transferred to high power units. One important fact is that as higher current carrying capability semi-conducting switching devices are selected, the device becomes highly susceptible to internal damage. In particular the initial rate of rise of current, termed $i/dt$, must be maintained at a relatively low rate until the total area of the switch is completely turned on. This is due to the fact that the area available for conducting current is initiated at the switch gate and spreads across the entire wafer.

Likewise after the period of current conduction the forward voltage across the switch must be such as to maintain the current below the holding value for an appreciable period of time until the switching device has recovered its ability to withstand application of forward voltage. There is a relationship between the amount of current the switching device has conducted on the previous cycle, the time since the said device has ceased to conduct and the rate at which forward voltage, termed $dv/dt$, is applied. If too high a rate of rise of voltage occurs too soon after current has ceased to flow through the device, it will break down spontaneously. The resulting line to line short circuit can produce an expensive failure of the components.

In many converters there is a potential of a line to line faulting occurring through semi-conducting switching devices in series and, because of the characteristics of the said semi-conductor switching devices, it is difficult to obtain the short time constant protection that will prevent failure of a semi-conducting device. In this invention therefore impedance is inserted in the potential short circuit path to limit the current to a safe value, and prevent failure of any of the semi-conducting switching devices.

The converter of this invention satisfactorily resolves these problems and adapts itself well to parallel operation of individual units to provide high output power levels.

It is an objct of this invention to provide a versatile frequency converter utilizing silicon controlled rectifiers for induction heating and melting loads capable of delivering full power continuously into changing loads.

A further object of this invention is to provide means to control the rate of rise of current through the semi-conducting switching devices and to keep the same within safe limits.

Another object is to reduce the rate of rise of forward voltage on solid state semi-conducting switching devices that have just ceased to conduct current.

Another object of the invention is to provide a high impedance path to limit the short circuit current through the semi-conducting switching devices to a safe value until safety devices can function.

Another object of the invention is to provide a semi-conducting switching device frequency converter with a structure that adapts itself well to parallel operation.

Another object is to provide a frequency converter which will be efficient and reliable in operation and which will require a minimum of operator control.

In order that the invention may be more clearly understood two preferred frequency converters are described here and by way of example reference will be made to the accompanying drawings, in which drawings like parts are designated by like reference characters:

FIG. 1 shows a basic frequency converter circuit connected between a three-phase low frequency source of alternating current and a single phase high frequency load;

FIG. 1A illustrates an alternate connection for the load of FIG. 1;

FIG. 1B is a conventional representation of the load of FIGS. 1 and 1A;

Figure 2:
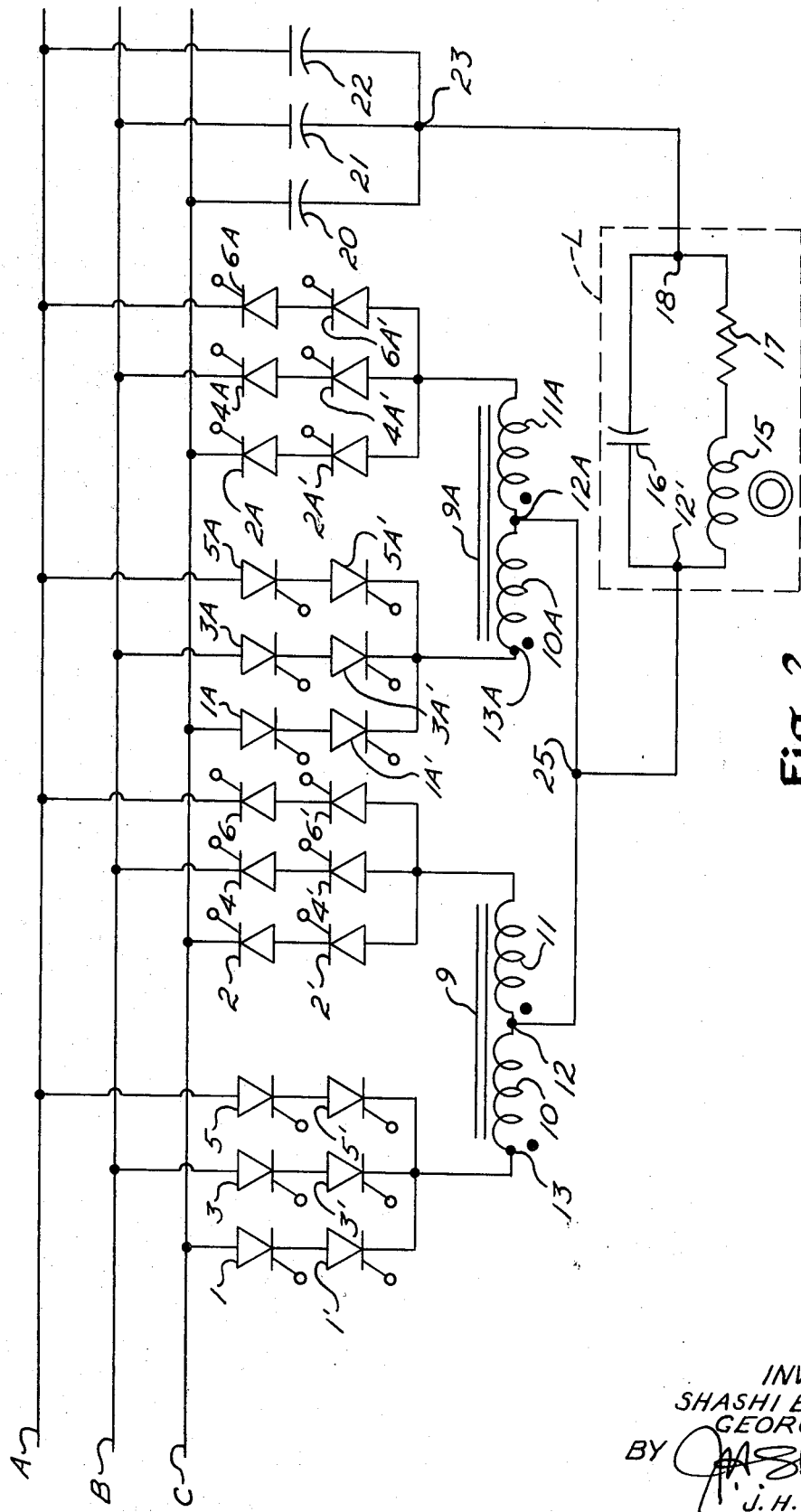
FIG. 2 shows the parallel combination of two frequency converters of the type shown in FIG. 1 employing series connected semi-conducting switching devices.

The frequency converter of this invention shown in FIG. 1 is connected to a three-phase low frequency alternating current power source. The separate phases thereof are shown at A, B, and C. The converter includes a series of solid state, semi-conducting switching devices 1 to 6, inclusive. The anodes of the three of the switches 1, 3, and 5 are connected each to a phase of the source A, B, and C and can be termed "positive" conducting switches. The remaining three switches have their cathodes connected in the said three phases of the source and can be termed "negative" conducting switches. The said switches are triggered through gating pulses, as will be understood by those skilled in the art. The cathodes of switches 1, 3 and 5 have a common connection at point 7 and are connected to a terminal 13 of an inductance winding 10. The anodes of switches 2, 4, and 6 have a common connection 8 and are connected to a terminal 14 of inductance winding 11. The inductances 10 and 11 are magnetically coupled on core 9 and have a common terminal 12. It is preferable that substantially close coupling of the inductances be employed and the leakage be controlled as desired. The terminal 12 of inductances 10 and 11 is connected to a high frequency terminal 12' for the output connection to the induction heating load "L." The converter also includes three capacitors, 20, 21 and 22, connected in Y, with one terminal of each connected to each of the said phases A, B, and C and the second terminal of each connected to a common point 23, connected to a second high frequency output terminal 18 for the induction heating load "L." The load as shown comprises a single-phase induction heating coil 15 with capacitance 16 that tune the combination to a higher variable frequency than the polyphase lower frequency supply A, B, and C and the said load as represented in FIG. 1B is an inductance 15 in series with a resistance 17 connected in parallel with the capacitance 16. In the form of FIG. 1A an isolating transformer is shown at "T" disposed between the output terminals 12 and 23 and the load terminals 12' and 18.

As illustrated, the switches 1 through 6, the inductance 10, 11 and the load "L" including the induction heating coil 15 and its tuning capacitance 16, and the capacitors 20, 21 and 22 are connected in series. The load "L" has a self-resonant or a natural oscillatory frequency. In operation, the converter of this invention, it is to be assumed, operates approximately at the same said load self-resonant frequency. The conducting inductance 10, 11 at this operating frequency has an effective impedance substantially less than the effective impedance of the capacitors 20, 21 and 22 and the series resonant frequency of the converter is higher than the operating frequency.

"Effective impedance of the inductance 10, 11," as used herein, may be defined as the product of one of the inductances 10 or 11 in henrys times 2 π times the operating frenquency. "Effective impedance of the capacitors 20, 21 and 22," as used herein, may be defined as the reciprocal of 2 π times the operating frequency times the total capacitance in farads.

Figure 3:
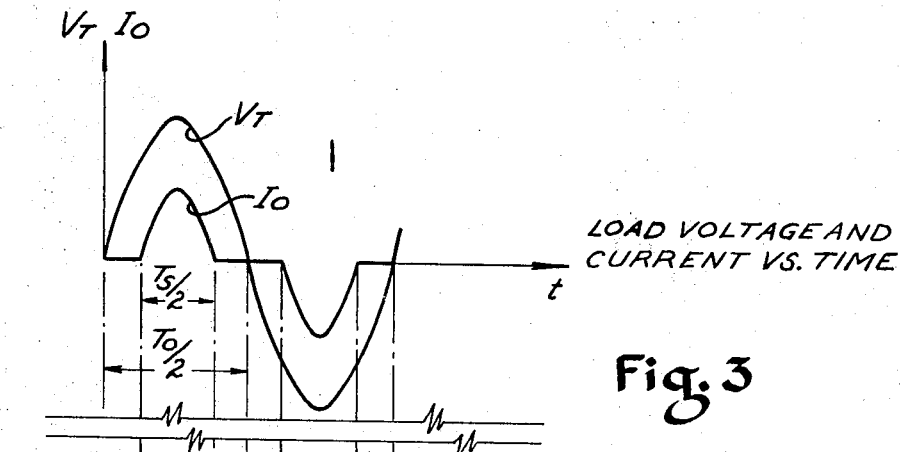
FIG. 3 shows the relationship between load voltage and converter output current.

In operation one of the semi-conducting switches, for example, switch 1, is caused to conduct and current flows through said switch through inductance 10, through the load "L," and through the capacitors 21 and 22 back to the source. The value of the inductance 10 as selected controls the rate of rise of current through the switch 1, limiting it to safe value, and in combination with the load "L" and the capacitors 21 and 22 forms a series resonant circuit that limits the time of current flow to less than one-half cycle of the operating frequency as illustrated in FIG. 3.

As the capacitors 21 and 22 conduct the load current they are charged to a value so that the voltage across the switch 1 is first reduced to zero and then to a negative value and current ceases to flow to the load.

Switch 4 is then caused to conduct and current starts to flow in the series resonant circuit in an opposite direction from that described above through capacitors 20 and 22, through the load "L," through inductance 11 and through said switch 4. The inductance 11 controls the rate of rise of current through the switch 4 and limits it to a safe value. Additionally, voltage impressed between terminals 8 and 12 of the inductance 11 produces an induced voltage in inductance 10 and produces such a voltage between terminals 12 and 13 as to reduce the rate of rise of forward voltage on the semi-conductor switches 1, 3, and 5. This is particularly important in that switch 1 has just ceased to conduct current and is therefore more highly susceptible to breakdown by $dv/dt$ action. Current continues to flow through inductance 11 until capacitors 20 and 22 are charged sufficiently to cause the voltage on switch 4 to be reduced to zero at which point load current flow ceases. Preferable operation of the converter consists in alternate operation of a positive conducting switch and a negative conducting switch.

Induction heating loads are characterized by changes in value of inductance and resistance as the load goes through its heating cycle. For instance, melting loads consisting of small scraps initially have high resistance and high reactance; however, as the said charge is heated and becomes molten, the melt has relatively low resistance and relatively low reactance. The self resonant frequency of the load thus changes significantly from start to finish.

In certain prior art fixed frequency installations of known types consisting of either alternator sources or magnetic multipliers or fixed frequency switch converters, with which we are familiar, it has been found necessary to frequently adjust the amount of capacitance to maintain the load at resonant conditions at operating frequency. With the present invention the operating frequency of the load circuit is sensed and the timing of the pulses delivered to the switches is automatically adjusted without the necessity of adjusting capacitance. The preferred relationship between the value of inductance 10, 11 and the capacitor bank 20, 21 and 22 is maintained as described above.

FIG. 2 discloses a similarly operating converter wherein each of the switches 1 through 6 as connected in FIG. 1 to a separate phase of the polyphase source are connected in series with each of switches 1' through 6' for operation from higher voltage sources. A second set of solid state switches 1A through 6A and 1A' through 6A' are similarly connected to the separate phases of the said polyphase source. Terminals 12 and 12A of inductances 10, 11 and 10A, 11A respectively, are connected by a single terminal 25 to the high frequency terminal 12' for an output connection to the load. As in FIG. 1, capacitors 20, 21 and 22 are connected to separate phases of the low frequency polyphase source and their common connection 23 is connected to the high frequency terminal 18 to form the other output terminal for the load. In this configuration, inductances 10, 11 and 10A and 11A are effectively in parallel and the effective impedance at the operating frequency of the converter is preferably substantially less than the impedance of the capacitor bank 20, 21 and 22. In operation, switches 1 and 1', 1A and 1A' are simultaneously caused to conduct. Inductances 10, 10A act to limit the rate of rise of current in their respective switches, and capacitors 21 and 22 conduct the load current and are charged to a voltage sufficient to cause switches 1 and 1', 1A and 1A' to cease conducting. Switches 4 and 4", 4A and 4A' are then caused to conduct and the current rate of rise is controlled by the inductance of windings 11 and 11A. Likewise the voltage appearing between terminals 12 and 13, 12A and 13A is effective to reduce the rate of rise of voltage on the positive bank of switches 1, 1' et al. 1A, 1A' et al. and again enhances the operation of said switches as described above.

Figure 3A:
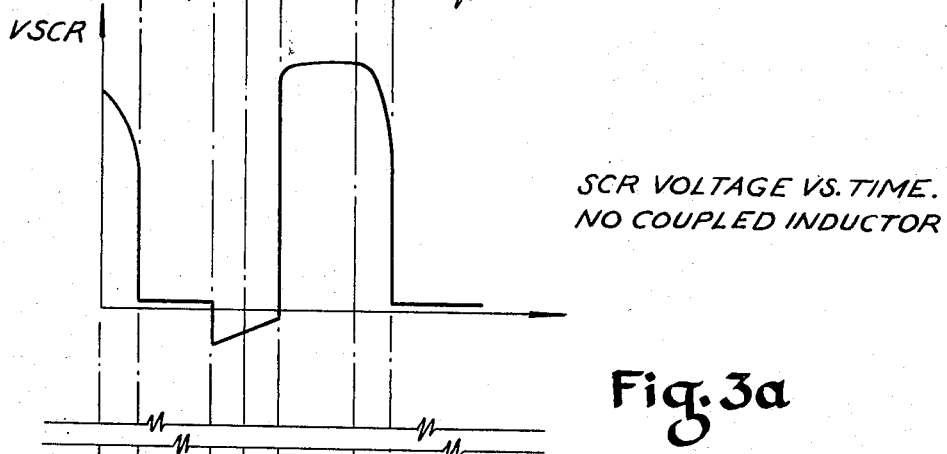
FIG. 3A illustrates the voltage appearing across the semi-conducting switching devices when the inductance is not connected in accordance with the application.
Figure 3B:
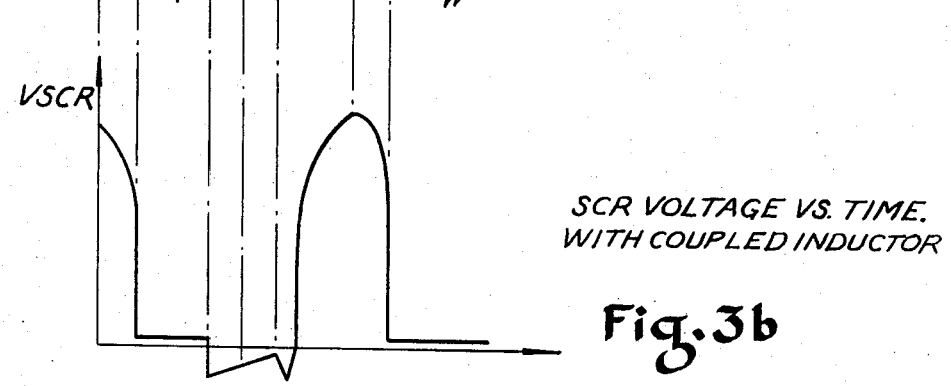
FIG. 3B shows the voltage appearing across the semi-conducting switching devices with the preferred connection.

FIGS. 3, 3A and 3B illustrate the time relationship between the output voltage, the output current and voltage appearing across a switching device in the circuits illustrated. The preferred output current as shown has a one-half period somewhat less than the output voltage one-half period. A time graph of the voltage appearing across a switching device of the type shown but conventionally connected is shown in FIG. 3A. In FIG. 3B a time graph of voltage appearing across a similar switching device in the circuit of the present invention illustrates the difference in the voltage produced across the switching device. The action of the inductance employed herein increases the time after a conduction period before the voltage becomes positive on a positive conducting switch and reduces the rate of rise of positive voltage $dv/dt$.

What is claimed is:

1. A frequency converter for converting electric power from a three-phase low frequency alternating current source to a higher frequency single phase AC output to supply power for a load, the load comprising an induction coil with parallel capacitance, said higher frequency being approximately the resonant frequency of said load, comprising a set of capacitors connected in Y to said source, the Y connection point constituting one high frequency terminal for said load, a pair of inductance windings provided with a common connection and having an effective impedance at said higher frequency substantially less than the effective impedance of said capacitors, one set of semi-conductor switching devices having their anodes each connected to one phase of said source and their cathodes connected together at one end terminal of a first said inductance winding, another set of semi-conductor switching devices having their cathodes each connected to one phase of said source and their anodes connected together at one end terminal of a second inductance winding, said common connected of said inductance constituting the other high frequency output terminal for said load, one each of the said switching devices in one of said sets of switching devices being energized alternately each half cycle of the operating frequency.

2. A frequency converter according to claim 1 wherein the semi-conductor switching devices are connected in series.

3. A frequency converter according to claim 1 wherein the said inductances joining the positive and negative sets of switches are linear inductances with a controlled amount of leakage therebetween.

4. A frequency converter according to claim 1 wherein an isolating transformer is used between the output terminals and the load terminals.

5. A frequency converter in accordance with claim 1 wherein the operating frequency of the converter is at approximately the load self-resonant frequency.

6. A frequency converter as claimed in claim 1 wherein the load current flows alternately through one of said inductance windings and voltage is induced in the non-current conducting other inductance winding.

7. A frequency converter for converting electric power from a three-phase low frequency alternating current source to a higher frequency single-phase alternating current output to supply power for a load, the load comprising an inductance coil with parallel capacitance, and higher frequency being approximately the resonant frequency of said load, comprising a set of capacitors connected in Y to said source, the Y connection point constituting one high frequency terminal for said load, two pair of inductance windings each provided with a common connection for the windings thereof and having an effective impedance at said higher frequency substantially less than the effective impedance of said capacitors, two sets of semi-conductor switching devices each having anodes of certain of each said set of devices each connected to one phase of said source and their cathodes each connected in series to an anode of other semi-conducting switching devices in said set, said other devices having their cathodes connected together at a common connection for the first pair of inductance windings, the second pair of sets of semi-conductor switching devices having the cathodes of certain of said switching devices each connected to each phase of said source and each of the anodes of said certain switching devices connected in series to the cathodes of other semi-conductor switching devices in said set which latter switches have their anodes connected to a common connection for the second pair of inductance windings, each of the pair of inductances having a common connection constituting the other high frequency output terminal for the load.

8. A frequency converter consisting of converters according to claim 1 connected in parallel to provide higher power output.

References Cited

UNITED STATES PATENTS

| | | | |
|---|---|---|---|
| 3,323,076 | 5/1967 | Pelly | 321—7X |
| 3,349,315 | 10/1967 | Studtmann | 321—45 |
| 3,350,621 | 10/1967 | Caldwell | 321—7 |
| 3,431,483 | 3/1969 | Lafuze | 321—7 |

WILLIAM M. SHOOP, JR., Primary Examiner

U.S. Cl. X.R.

321—58, 69